United States Patent

Steuerle et al.

[11] Patent Number: 6,063,286
[45] Date of Patent: May 16, 2000

[54] MODIFIED, FINE-PARTICLE, WATER-INSOLUBLE AZIRIDINE POLYMER AND USE THEREFORE FOR REMOVING HEAVY METALS FROM AQUEOUS SOLUTION

[75] Inventors: Ulrich Steuerle; Wolfgang Reuther, both of Heidelberg; Hubert Meixner; Michael Ehle, both of Ludwigshafen; Thomas Greindl, Bad Dürkheim; Rainer Betz, Ludwigshafen, all of Germany

[73] Assignee: BASF Aktiengesellschaft, Ludwigshafen, Germany

[21] Appl. No.: 09/147,170

[22] PCT Filed: Apr. 23, 1997

[86] PCT No.: PCT/EP97/02062

§ 371 Date: Oct. 22, 1998

§ 102(e) Date: Oct. 22, 1998

[87] PCT Pub. No.: WO97/40088

PCT Pub. Date: Oct. 30, 1997

[30] Foreign Application Priority Data

Apr. 23, 1996 [DE] Germany ............................ 196 16 120

[51] Int. Cl.[7] ................ C02F 1/28; C08G 73/02
[52] U.S. Cl. .................. 210/688; 210/912; 525/410; 525/414; 502/402
[58] Field of Search ..................... 210/688, 912, 210/681; 525/410, 414; 502/402; 528/424

[56] References Cited

U.S. PATENT DOCUMENTS 3,200,088   8/1965   Tousignant et al. .
3,885,069   5/1975   Roberts et al. ............... 210/688
4,125,708  11/1978   Masri et al. .................. 210/688
4,133,929   1/1979   Bowes et al. ................. 210/688
5,294,652   3/1994   Rainer ......................... 210/688
5,347,071   9/1994   Moriya et al. ................ 210/912

FOREIGN PATENT DOCUMENTS 58-150434   9/1983   Japan .

OTHER PUBLICATIONS

Patent Abstracts of Japan, vol. 12, No. 252 (C–512), Jul. 15, 1988, JP 63 041532, Feb. 22, 1988.

*Primary Examiner*—David A. Simmons
*Assistant Examiner*—Frank M. Lawrence
*Attorney, Agent, or Firm*—Oblon, Spivak, McClelland, Maier & Neustadt, P.C.

[57] ABSTRACT

Process for preparing fine-particle, water-insoluble polymers of aziridines by polymerizing aziridines, preferably ethylenimine, in the presence of crosslinkers which contain at least two functional groups, and in at least one ether, and also modified, water-insoluble polymers of aziridines which can be obtained by reacting fine-particle, water-insoluble, crosslinked polymers of aziridines, in aqueous medium, with carbon disulfide or formaldehyde and a nucleophilic agent from the group consisting of alkali metal cyanides, primary amines, secondary amines, alkali metal sulfites and alkali metal phosphites, and use of the modified and non-modified fine-particle, water-insoluble polymers for immobilizing active compounds, as absorbents for aldehydes, ketones and acids, and also for removing heavy metal ions from wastewaters.

10 Claims, No Drawings

MODIFIED, FINE-PARTICLE, WATER-INSOLUBLE AZIRIDINE POLYMER AND USE THEREFORE FOR REMOVING HEAVY METALS FROM AQUEOUS SOLUTION

The preparation of fine-particle, water-insoluble polymers of aziridines, and of modified, water-insoluble polymers of aziridines, and their use.

The present invention relates to a process for preparing fine-particle, water-insoluble polymers of aziridines by polymerizing aziridines in the presence of crosslinkers which contain at least two functional groups and in an inert solvent, to modified, water-insoluble polymers of aziridines, and to the use of the fine-particle, water-insoluble polymers, and of the modified polymers, for immobilizing active compounds, as absorbents for aldehydes, ketones and acids, and for removing heavy metal ions from waste waters.

U.S. Pat. No. 3,200,088 discloses the polymerization of alkylene imines, preferably ethylenimine, using small quantities of polyhalogenated alkanes in the presence of traces of certain metal compounds or metals such as, in particular, copper. The polymerization can be carried out as a bulk polymerization or as a solution polymerization in water, water-soluble alcohols or mixtures of the said solvents. The polyhalogenated alkanes are employed in quantities of from 1 to 5% by weight, based on alkylenimine. When quantities of halogenated alkanes are used which are greater than 5% by weight, insoluble gels of a honey-like consistency are formed which are almost impossible to filter.

U.S. Pat. No. 3,885,069 discloses the polymerization of ethylenimine with polyhalogenated compounds in a molar ratio of from 44:1 to 27:1, where a mixture of the two reactants is first allowed to react at from 10 to 50° C. for from 2 to 16 hours, with the formation of a prepolymer, the mixture is then processed into a 5 to 50% strength solution by adding water or ethanol, and this solution is used to impregnate a fibrous cellulose-containing support material, which is then dried at 25° C. until the prepolymer is crosslinked. Owing to its insolubility in solvents, the polymer is firmly bound to the fibrous support material and cannot be isolated easily. The reaction products which can be obtained in this way are used for removing heavy metal ions, such as copper ions or mercury ions, from aqueous solutions.

JP-A-63/041 532 discloses polymerizing aziridines with from 0.5 to 40% by weight of a crosslinker in hydrocarbons, in the presence of dispersants and under the influence of acidic catalysts, to form solid products which are used, for example, for immobilizing proteins or for removing metal ions from aqueous solutions. However, the solid products which result during the polymerization can only be filtered with difficulty and contain adhering dispersants which are often difficult to remove.

Processes for preparing fine-particle, water-insoluble polymers of aziridines by polymerizing aziridines in the presence of crosslinkers which contain at least two functional groups and in an inert solvent are known. The inert solvent used comprises at least one ether, suitable ethers having all those which are inert towards aziridines and crosslinkers and are liquid at least under the reaction conditions.

Examples of ethers are dialkyl ethers which carry from 1 to 6 C atoms in the alkyl group, e.g. diethyl ether, methyl n-propyl ether, methyl isopropyl ether, methyl n-butyl ether, methyl sec-butyl ether, methyl tert-butyl ether, ethyl hexyl ether and di-n-butyl ether.

Further suitable ethers are end group-capped polyalkylene glycols which contain, for example, from 2 to 50 polymerized alkylene oxide units. $C_1$- to $C_4$-alkyl groups are suitable for use as the end group cap. Preferably, the end group-capped polyalkylene glycols possess methyl groups or ethyl groups. The end group-capped polyalkylene glycols can be obtained, for example, by alkylating polyalkylene glycols. Examples of suitable polyalkylene glycols are polyethylene glycols, polypropylene glycols and polybutylene glycols and also block copolymers of ethylene oxide and propylene oxide or ethylene oxide and butylene oxide or of ethylene oxide, propylene oxide and butylene oxide or block copolymers of propylene oxide and butylene oxide. Those end group-capped polyalkylene glycols which are preferably employed are glycols from the following group which are end group-capped with methyl groups or ethyl groups at both ends: diethylene glycol, triethylene glycol, dipropylene glycol, tripropylene glycol and dibutylene glycol.

Further suitable ethers are derived from polytetrahydrofuran which contains from 2 to 50 tetrahydrofuran units in the molecule and which is end group-capped at both ends with $C_1$- to $C_4$-alkyl groups. Use is preferably made, from this group, of ditetrahydrofuran ethers or tritetrahydrofuran ethers which are end group-capped at both ends with methyl groups or ethyl groups.

Further suitable ethers are derived from ethylene glycol, propylene glycol and butylene glycol which are in each case end group-capped at both ends with $C_1$- to $C_4$-alkyl. Use is preferably made, from this group of compounds, of dimethyl ethers of ethylene glycol, propylene glycol and butylene glycol. Further suitable solvents are tetrahydrofuran and dioxane.

Methyl tert-butyl ether, tetrahydrofuran, dioxane, or mixtures of the said solvents, are preferably employed in the process according to the invention.

The concentration of aziridine and crosslinkers in the inert ethers which are to be employed in accordance with the invention is, for example, from 1 to 80, preferably from 25 to 50%, by weight, based on the mixture. Examples of suitable aziridines which are polymerized are ethylenimine, propylenimine, N-(2-aminoethyl)aziridine, N-(3-aminopropyl)aziridine and 1,2-butylenimine.

Ethylenimine is preferably employed as the aziridine.

Suitable crosslinkers, which contain at least two functional groups, are $\alpha,\omega$- or vicinal dichloroalkanes such as 1,2-dichloroethane, 1,2-dichloropropane, 1,3-dichloropropane, 1,4-dichlorobutane and 1,6-dichlorohexane. Further suitable crosslinkers are glycidyl halides such as epichlorohydrin, polyepoxides such as polyethylene glycol bisglycidyl ether or polyaziridines or $\alpha$-$\omega$-diisocyanates such as hexamethylene diisocyanate, chloroformates, phosgene and, in particular, halogen-free crosslinkers. The halogen-free crosslinkers are at least bifunctional and are preferably selected from the group consisting of:

(1) ethylene carbonate, propylene carbonate and/or urea,
(2) monoethylenically unsaturated carboxylic acids and their esters, amides and anhydrides, at least dibasic saturated carboxylic acids or polycarboxylic acids and also the esters, amides and anhydrides which are in each case derived therefrom,
(3) reaction products of polyether diamines, alkylene diamines, polyalkylene polyamines, alkylene glycols or polyalkylene glycols, or their mixtures, with monoethylenically unsaturated carboxylic acids or esters, amides or anhydrides of monoethylenically unsaturated carboxylic acids, with the reaction products exhibiting at least two ethylenically unsaturated double bonds, or carboxamide, carboxyl or ester groups as functional groups, (4) reaction products of dicarboxylic acid esters with ethylenimine, which products contain at least two aziridino groups, and also mixtures of the said crosslinkers.

Of the group (1) crosslinkers, preference is given to employing propylene carbonate.

Examples of suitable halogen-free group (2) crosslinkers are monoethylenically unsaturated monocarboxylic acids such as acrylic acid, methacrylic acid and crotonic acid, and also the amides, esters and anhydrides which are derived therefrom. The esters can be derived from alcohols having from 1 to 22, preferably from 1 to 18, C atoms. While the amides are preferably unsubstituted, they can, however, carry one $C_1$- to $C_{22}$-alkyl radical as substituent.

Further halogen-free group (2) crosslinkers are at least dibasic saturated carboxylic acids, such as dicarboxylic acids, and also the salts, diesters and diamides which are derived therefrom. These compounds can be characterized, for example, with the aid of the formula

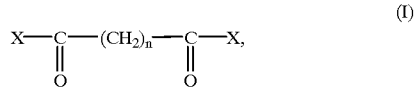

(I)

where

X=OH, OR,

$R=C_1$- to $C_{22}$-alkyl, $R^1$=H, $C_1$- to $C_{22}$-alkyl, and n=0 to 22.

Monoethylenically unsaturated dicarboxylic acids, such as maleic acid or itaconic acid, are, for example, suitable in addition to the dicarboxylic acids of the formula I. The esters of the dicarboxylic acids which come into consideration are preferably derived from alcohols having from 1 to 4 carbon atoms. Examples of suitable dicarboxylic acid esters are dimethyl oxalate, diethyl oxalate, diisopropyl oxalate, dimethyl succinate, diethyl succinate, diisopropyl succinate, di-n-propyl succinate, diisobutyl succinate, dimethyl adipate, diethyl adipate and diisopropyl adipate. Examples of suitable esters of ethylenically unsaturated dicarboxylic acids are dimethyl maleate, diethyl maleate, diisopropyl maleate, dimethyl itaconate and diisopropyl itaconate. Substituted dicarboxylic acids and their esters, such as tartaric acid (D form, L form and as racemate) and also tartaric acid esters, such as dimethyl tartrate and diethyl tartrate, are also suitable.

Examples of suitable dicarboxylic acid anhydrides are maleic anhydride, itaconic anhydride and succinic anhydride. Aziridines are crosslinked with the abovementioned halogen-free crosslinkers with the formation of amide groups or, in the case of amides such as adipic acid diamide, by means of transamidation. Maleic esters, and monoethylenically unsaturated dicarboxylic acids, and also their anhydrides, can effect crosslinking both by forming carboxamide groups and also by adding NH groups by means of a Michael addition.

At least dibasic saturated carboxylic acids include, for example, tricarboxylic and tetracarboxylic acids such as citric acid, propanetricarboxylic acid, ethylenediaminetetraacetic acid and butanetetracarboxylic acid. The salts, esters, amides and anhydrides which are derived from the abovementioned carboxylic acids are also suitable group (2) crosslinkers.

Polycarboxylic acids which can be obtained by polymerizing monoethylenically unsaturated carboxylic acids or anhydrides are also suitable group (2) crosslinkers. Examples of suitable monoethylenically unsaturated carboxylic acids are acrylic acid, methacrylic acid, crotonic acid, maleic acid and/or itaconic acid. Thus, for example, polyacrylic acids, copolymers of acrylic acid and methacrylic acid or copolymers of acrylic acid and maleic acid are suitable for use as crosslinkers.

Further suitable (2) crosslinkers are prepared, for example, by polymerizing anhydrides, such as maleic anhydride, in an inert solvent, such as toluene, xylene, ethylbenzene or isopropylbenzene, or solvent mixtures, in the presence of free radical-forming initiators. Preference is given to using peroxy esters, such as tert-butyl per-2-ethylhexanoate, as initiators. Copolymers of maleic anhydride, for example copolymers of acrylic acid and maleic anhydride or copolymers of maleic anhydride and a $C_2$- to $C_{30}$-olefin, are also suitable in addition to the homopolymers.

Preference is given, for example, to copolymers of maleic anhydride and isobutene or copolymers of maleic anhydride and diisobutene. The anhydride group-containing copolymers may, where appropriate, be modified by reacting them with $C_1$- to $C_{20}$-alcohols or ammonia or amines, and be employed in this form as crosslinkers.

The molar mass $M_w$ of the homopolymers and copolymers is, for example, up to 10,000, preferably from 500 to 5,000. Polymers of the abovementioned type are described, for example, in EP-A-0 276 464, U.S. Pat. No. 3,810,834, GB-A-1 411 063 and U.S. Pat. No. 4,818,795. The saturated carboxylic acids which are at least dibasic, and the polycarboxylic acids, can also be employed as crosslinkers in the form of their alkali metal salts or ammonium salts. In this context, preference is given to using the sodium salts. The polycarboxylic acids can be partially neutralized, e.g. up to from 10 to 50 mol %, or else completely neutralized.

Group (2) compounds which are preferably employed are dimethyl tartrate, diethyl tartrate, dimethyl adipate, diethyl adipate, dimethyl maleate, diethyl maleate, maleic anhydride, maleic acid, acrylic acid, methyl acrylate, ethyl acrylate, acrylamide and methacrylamide.

Examples of halogen-free group (3) crosslinkers are reaction products of polyether diamines, alkylene diamines, polyalkylene polyamines, alkylene glycols and polyalkylene glycols, or their mixtures, with monoethylenically unsaturated carboxylic acids, esters of monoethylenically unsaturated carboxylic acids, amides of monoethylenically unsaturated carboxylic acids, or anhydrides of monoethylenically unsaturated carboxylic acids.

The polyether diamines are prepared, for example, by reacting polyalkylene glycols with ammonia. The polyalkylene glycols can contain from 2 to 50, preferably from 2 to 40, alkylene oxide units. The polyalkylene glycols can, for example, be polyethylene glycols, polypropylene glycols or polybutylene glycols, or else block copolymers of ethylene glycol and propylene glycol, block copolymers of ethylene glycol and butylene glycol or block copolymers of ethylene glycol, propylene glycol and butylene glycol. Apart from the block copolymers, copolymers which are randomly assembled from ethylene oxide and propylene oxide and also, where appropriate, butylene oxide are also suitable for preparing the polyether diamines. In addition, polyether diamines are derived from polytetrahydrofurans which possess from 2 to 75 tetrahydrofuran units. The polytetrahydrofurans are likewise converted by reaction with ammonia into the corresponding α,ω-polyether diamines. Preference is given to using polyethylene glycols or block copolymers of ethylene glycol and propylene glycol for preparing the polyether diamines.

Examples of suitable alkylene diamines are ethylenediamine, propylenediamine, 1,4-diaminobutane and 1,6-diaminohexane. Examples of suitable polyalkylene polyamines are diethylenetriamine, triethylenetetramine, dipropylenetriamine, tripropylenetetramine, dihexamethylenetriamine, aminopropylethylenediamine, bis-aminopropylethylenediamine and polyethylenimines having molar masses of up to 5000. The above-described amines are reacted with monoethylenically unsaturated carboxylic acids, or esters, amides or anhydrides of monoethylenically unsaturated carboxylic acids, such that the resulting products possess at least 2 ethylenically unsaturated double bonds, carboxamide, carboxyl or ester groups, as functional groups. Thus, for example, when the amines or glycols under consideration are reacted with maleic anhydride, compounds are obtained which can, for example, be characterized with the aid of the formula II:

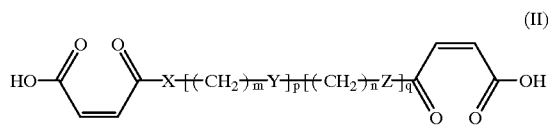

where
X, Y and Z=O or NH, and Y is also $CH_2$
m and n=0–4
p and q=0–45,000.

The compounds of the formula (II) can be obtained, for example, by reacting alkylene glycols, polyethylene glycols, polyethylenimines, polypropylenimines, polytetrahydrofurans, α,ω-diols or α,ω-diamines with maleic anhydride or the other abovementioned monoethylenically unsaturated carboxylic acids or carboxylic acid derivatives. The polyethylene glycols which are suitable for preparing the crosslinkers II preferably have molar masses of from 62 to 10,000, while the molar masses of the polyethylenimines are preferably from 129 to 50,000 and those of the polypropylenimines are from 171 to 50,000. Examples of suitable alkylene glycols are ethylene glycol, 1,2-propylene glycol, 1,4-butanediol and 1,6-hexanediol.

α,ω-Diamines which are preferably employed for preparing the crosslinkers of the formula II are ethylenediamine and α,ω-diamines which are derived from polyethylene glycols or polytetrahydrofurans having molar masses $M_w$ of in each case from about 400 to 5,000.

Suitable crosslinkers of the formula II which are particularly preferred are reaction products of maleic anhydride with α,ω-polyether diamines having a molar mass of from 400 to 5000, the reaction products of polyethylenimines having a molar mass of from 129 to 50,000 with maleic anhydride, and the reaction products of ethylenediamine or triethylenetetramine with maleic anhydride in a molar ratio of 1:at least 2. When polyalkylene glycols or diols are reacted with monoethylenically unsaturated carboxylic acids, or their esters, amides or anhydrides, crosslinkers are formed, with retention of the double bond of the monoethylenically unsaturated carboxylic acids or their derivatives, in which the monoethylenically unsaturated carboxylic acids, or their derivatives, are linked to the polyether diamines, alkylene diamines or polyalkylene polyamines by way of an amide group and to the alkylene glycols or polyalkylene glycols by way of an ester group. These reaction products contain at least two ethylenically unsaturated double bonds. This crosslinker type reacts with the aziridines or the amino groups of the polymers which are being formed by means of a Michael addition of the amino groups of the polymers to the terminal double bonds of these crosslinkers and, where appropriate, additionally with the formation of amide groups.

Polyether diamines, alkylene diamines and polyalkylene polyamines can also react with maleic anhydride, or the ethylenically unsaturated carboxylic acids or their derivatives, while adding onto the double bond by means of a Michael addition. Crosslinkers of the formula III are then obtained

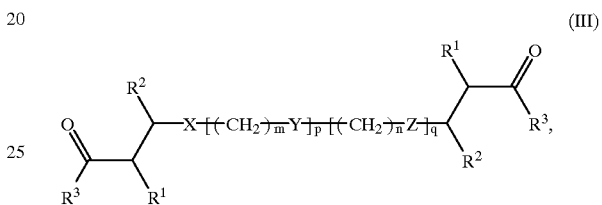

where
X, Y and Z=O or NH and Y is also $CH_2$
$R^1$=H or $CH_3$
$R^2$=H, COOMe, COOR or $CONH_2$
$R^3$=OR, $NH_2$, OH or OMe
R=$C_1$- to $C_{22}$-alkyl
Me=H, Na, K, Mg or Ca
m and n=0–4
p and q=0–45,000.

The crosslinkers of the formula (III) effect, by way of their terminal carboxyl or ester groups, and with the formation of an amide function, a crosslinking with the amino groups of the polymers which are produced during the polymerization. This class of crosslinker system also includes the reaction products of monoethylenically unsaturated carboxylic esters with alkylene diamines and polyalkylene polyamines; for example the products resulting from the addition of ethylenediamine, diethylenetriamine, triethylenetetramine, tetraethylenepentamine and polyethylenimines, having molar masses of, for example, from 129 to 50,000, to acrylic esters or methacrylic esters, with at least 2 mol of the acrylic ester or methacrylic ester being employed per 1 mol of the amine component, are suitable. The $C_1$- to $C_6$-alkyl esters of acrylic acid or methacrylic acid are preferably employed as esters of monoethylenically unsaturated carboxylic acids. Methyl acrylate and ethyl acrylate are particularly preferred for preparing the crosslinkers. The crosslinkers which are prepared by the Michael addition of polyalkylene polyamines and ethylenically unsaturated carboxylic acids, esters, amides or anhydrides can possess more than two functional groups. The number of these groups depends on the molar ratio in which the reactants are employed in the Michael addition. Thus, for example, from 2 to 10, preferably from 2 to 8, mol of ethylenically unsaturated carboxylic acids, or their derivatives, can be added, by means of a Michael addition, to one mole of a polyalkylene polyamine which contains 10 nitrogen atoms. At least 2, to at most 4, mol of the ethylenically unsaturated carboxylic acids, or their derivatives, can be added, by means of a Michael addition, to in each case 1 mol of polyalkylene diamines and alkylene diamines.

When diethylenetriamine and a compound of the formula

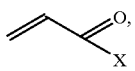

where
X=OH, $NH_2$ or $OR^1$, and
$R^1=C_1$- to $C_{22}$-alkyl,
are reacted, a crosslinker of the structure

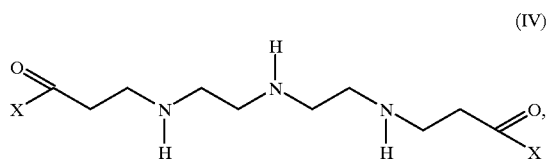

(IV)

where
$X=NH_2$, OH or $OR^1$, and
$R^1=C_1$- to $C_{22}$-alkyl,
is, for example, formed by means of a Michael addition.

The secondary NH groups in the compounds of the formula IV can, where appropriate, react with acrylic acid, acrylamide or acrylic esters by means of a Michael addition.

Use is preferably made, as group (3) crosslinkers, of the compounds of the formula II which contain at least 2 carboxyl groups and can be obtained by reacting polyether diamines, ethylene diamine or polyalkylene polyamines with maleic anhydride, or of Michael addition products which contain at least 2 ester groups and which are formed from polyether diamines, polyalkylene polyamines or ethylenediamine and esters of acrylic acid or methacrylic acid having in each case monohydric alcohols containing from 1 to 4 C atoms.

Reaction products which are prepared by reacting dicarboxylic esters, which are completely esterified with monohydric alcohols having from 1 to 5 carbon atoms, with ethylenimine are suitable for use as halogen-free group (4) crosslinkers. Examples of suitable dicarboxylic esters are dimethyl oxalate, diethyl oxalate, dimethyl succinate, diethyl succinate, dimethyl adipate, diethyl adipate and dimethyl glutarate. Thus, bis-[β-(1-aziridino)ethyl] oxalamide is obtained, for example, when diethyl oxalate is reacted with ethylenimine. The dicarboxylic esters are reacted with ethylenimine in, for example, a molar ratio of 1 to at least 4. The terminal aziridine groups are the reactive groups of these crosslinkers. These crosslinkers can be characterized, for example, with the aid of the formula V

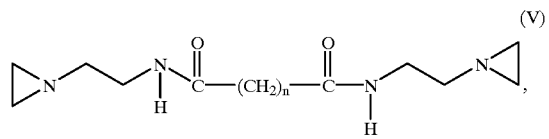

(V)

where
n=0 to 22.

Fine-particle, water-insoluble polymers are preferably prepared by polymerizing ethylenimine with 1,2-dichloroethane, epichlorohydrin or ethylenediamine-N,N'-(bis-maleic acid semiamide). In this connection, the crosslinkers are employed in such quantities that water-insoluble polymers are formed. The quantities of crosslinkers are, for example, from 0.001 to 0.5, preferably from 0.01 to 0.1, mol %, based on aziridines. Polymerization of the aziridines is initiated in a customary manner, for example using acids or Lewis acids such as boron trifluoride etherate. Polymerization of the aziridines, in particular of ethylenimine, is also initiated by crosslinkers; for example, epichlorohydrin, phosgene or dichloroalkanes such as ethylene chloride are suitable for use as initiators. The crosslinking polymerization of aziridines, in particular of ethylenimine, can be carried out in the absence of the customary acids if, for example, a compound of the formula I, II, III and/or IV possessing carboxyl groups is employed as the crosslinker. The above-described halogen-free group (3) and group (4) crosslinkers, in particular, act, for example during the polymerization of ethylenimine, as so-called spacers and lead, by way of bridged bifunctional or polyfunctional N-substituted aziridines of the structure VI, through further copolymerization with ethylenimine, to the formation of large-area, insoluble molecules of the structure VII:

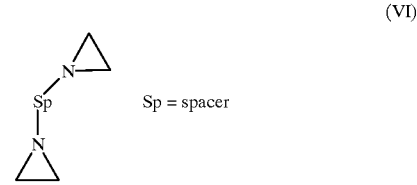

(VI)

Sp = spacer

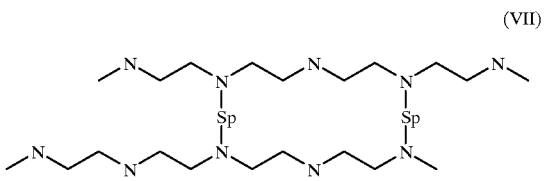

(VII)

Water-insoluble polymers of aziridines are obtained which have particle sizes in the range from, for example, 10 to 10,000, preferably from 100 to 5,000, μm.

The above-described fine-particle, water-insoluble, crosslinked polyaziridines can be modified using polymer-analogous reactions. The crosslinked polymers are particularly suitable for the modification if they are present in fine-particle form. However, it is also possible to modify crosslinked polyethylenimines which have been prepared by other processes. The known crosslinked polyethylenimines are, where appropriate, initially converted into a fine-particle form, for example by grinding a solid crosslinked polyethylenimine. After that, the fine-particle, crosslinked polyethylenimines are slurried in water and subjected, in the form of polymer suspensions, to polymer-analogous reactions. Crosslinked polyethylenimines can be prepared, for example by the process disclosed in U.S. Pat. No. 3,332,841, by crosslinking polyalkylenimines with crosslinkers, which are at least bifunctional, in an inert solvent. For example, from 0.001 to 0.5 mol of a crosslinker is used per mole of polyethylenimine (calculated as monomer). Examples of suitable crosslinkers are epichlorohydrin, tartaric esters, acrylic esters, butadiene dioxide and α,ω-dihaloalkanes such as ethylene chloride. However, polyethylenimines can also be crosslinked with the other above-described crosslinkers, in particular with the halogen-free crosslinkers, by means of heating. In this context, the above-described group (1) to (4) halogen-free crosslinkers are preferred for crosslinking polyethylenimines.

It is an object of the present invention to provide novel substances which are suitable for removing metal ions from aqueous solutions.

We have found that this object is achieved by modified, fine-particle, water-insoluble polymers of aziridines which can be obtained by reacting fine-particle, water-insoluble, crosslinked polymers of aziridines, in aqueous medium, with carbon disulfide or with formaldehyde and a nucleophilic agent from the group consisting of alkali metal cyanides, primary amines, secondary amines, alkali metal sulfites and alkali metal phosphites. A particularly preferred type of modification is the carboxymethylation of fine-particle, water-insoluble, crosslinked polyethylenimines with formaldehyde and alkali metal cyanides by means of a Strecker reaction. Modified, fine-particle, water-insoluble, crosslinked polyethylenimines which are particularly preferred can be obtained by carboxymethylating under reduced pressure and at the same time passing an inert gas through the reaction mixture. Modified, fine-particle, water-insoluble, crosslinked polyethylenimines can preferably be obtained by carrying out the carboxymethylation of fine-particle, water-insoluble, crosslinked polyethylenimines with formaldehyde and sodium cyanide in aqueous medium at from 60 to 110° C. and under pressures of from $0.1 \cdot 10^5$ to $0.8 \cdot 10^5$ Pa (100 to 800 mbar). The concentration of crosslinked polyethylenimines in the aqueous suspension is, for example, from 1 to 50, preferably from 5 to 25%, by weight.

Another modification of the fine-particle, crosslinked polyethylenimines is achieved by phosphonomethylating fine-particle, water-insoluble, crosslinked polyethylenimines with formaldehyde and alkali metal phosphites. Another type of modification of the crosslinked polyethylenimines consists in reacting them by means of a Mannich reaction. The present invention relates, therefore, to modified, fine-particle, water-insoluble, crosslinked polyethylenimines which can be obtained by a Mannich reaction of fine-particle, water-insoluble, crosslinked polyethylenimines with formaldehyde and primary and/or secondary amines.

Another modification consists in reacting fine-particle, water-insoluble crosslinked polyethylenimines with formaldehyde and alkali metal sulfites at from 60 to 110° C.

The present invention also relates to modified, fine-particle, water-insoluble, crosslinked polymers of aziridines which can be obtained by reacting fine-particle, water-insoluble, crosslinked polyethylenimines with carbon disulfide at from 0 to 30° C. In this case, dithiocarbamates are formed.

The properties of water-insoluble, crosslinked polyethylenimines can be improved for technical purposes by a polymer-analogous derivatization of fine-particle, crosslinked polyethylenimines of the above-described type. For example, the ability of crosslinked, fine-particle, water-insoluble polyethylenimines to absorb heavy metal ions, in particular ions of the main group metals, transition metals, lanthanides and actinides from waste waters is markedly increased by carboxymethylation. The modification of crosslinked polyethylenimines by means of carboxymethylation leads, in particular, to a marked increase in the ability of the modified crosslinked polyethylenimines to absorb nickel ions, chromium III ions, cobalt ions, silver ions, manganese II ions and cadmium ions from waste waters. The carboxymethylation of polyethylenimines is preferably carried out in accordance with the above described Strecker synthesis. However, it can also be effected by reacting the crosslinked polyethylenimines with chloroacetic acid. In this context, modified crosslinked polyethyleneimines are particularly advantageously used which are obtained by Strecker synthesis and which exhibit a degree of carboxymethylation of from 75 to 100, preferably of from 80 to 95%. The metal-complexing ability of the carboxymethylated crosslinked polyethylenimines is superior to that of the unmodified crosslinked polyethylenimines. Intensely colored complexes are formed when carboxymethylated, crosslinked, fine-particle polyethylenimines are loaded with high quantities of transition metals. These complexes are hard compounds which, for example in the case of the blue copper II complex, contain one bound copper II ion for approximately 6 nitrogen atoms. Hard compounds of this nature may, in the ground state, be used, for example, as pigments.

The fine-particle, water-insoluble, crosslinked polymers of aziridines, and the modified fine-particle, water-insoluble, crosslinked polymers of aziridines, are used for immobilizing active compounds, as absorbents for aldehydes, ketones and acids, and also for removing heavy metal ions from waste waters. When the fine-particle, water-insoluble, crosslinked polyaziridines, preferably polyethylenimines, are employed for immobilizing active compounds, the active compounds are fixed by the basic amine functions of the fine-particle, crosslinked polyethylenimine forming a salt with acidic functions of the active compound, by the active compound forming labile chemical bonds with the crosslinked polyaziridines, or by joint coordination of the active compound and the solid, crosslinked polyethylenimine to a heavy metal ion. Thus, N-cyclohexyldiazeniumdioxy potassium, which is a water-soluble biocide for protecting wood, can, for example, be bound firmly to the fine-particle, crosslinked polyethylenimine by way of a copper coordination. In order to prepare this complex, the copper complex with water-insoluble, fine-particle polyethylenimines is formed first (the complexes contain at least 6 N atoms for every 1 Cu atom) and this complex is then treated with N-cyclohexyldiazeniumdioxy potassium in aqueous medium. This results in the formation of fine-particle, water-insoluble slurries of compounds having the following structural elements:

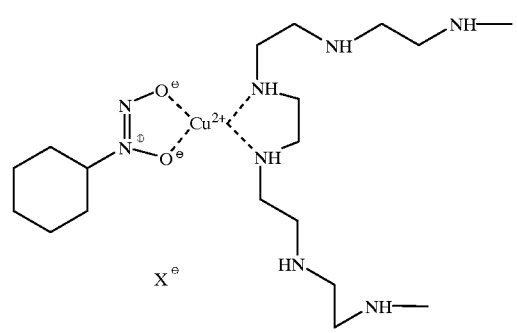

(VIII)

X=an anion, preferably chloride, sulfate or nitrate.

However, the abovementioned biocide can also be immobilized on crosslinked polyethylenimine by, for example, dissolving bis(N-cyclohexyldiazeniumdioxy) copper in an organic solvent, e.g. in acetone, and then bringing the solution into contact with solid, particulate crosslinked polyethylenimine. The active compounds which are immobilized on fine-particle, water-insoluble polyethylenimines are released in a controlled manner. For this reason, the fine-particle, water-insoluble polyethylenimines which are treated with bis(N-cyclohexyldiazeniumdioxy) copper can, for example, be used as wood preservatives. For example, a protectant depot of the immobilized active compound (for example borehole methods, bandages or cartridges) can be applied at particularly endangered sites in the wood. Since the biocide is released slowly, the wood can be protected against a multiplicity of decay-causing agents over a period of many years. Analogous results may be obtained, for example, with bis(N-cyclohexyldiazeniumdioxy) zinc or tris(N-cyclohexyldiazeniumdioxy) aluminum.

Apart from biocides, other active compounds, such as pharmaceuticals, cosmetics or plant protectants, can also be immobilized on the fine-particle, water-insoluble polyaziridines. The active compounds are likewise released in a targeted manner when the immobilized active compounds are applied in a corresponding fashion.

The fine-particle, water-insoluble, crosslinked polyaziridines are also suitable as absorbents for extracting formaldehyde or other aldehydes and ketones from waste waters or from exhaust air. Many applications ensue from this; for example, the crosslinked, fine-particle polyethylenimines can be employed in cigarette filters, in filters used for purifying waste water, or for absorbing formaldehyde in pressboard sheets. The fine-particle, crosslinked polyethylenimines are also useful for absorbing acidic gases such as sulfur dioxide, sulfur trioxide, hydrogen chloride and carbon dioxide. They may also be employed, for example, for removing acidic compounds, such as benzoic acid or p-toluenesulfonic acid, from aqueous solutions.

The fine-particle, water-insoluble polymers of aziridines are also useful for removing heavy metal ions from waste waters. In this context, particular preference is given to the solid/liquid extraction of heavy metals (main group metals, transition metals, lanthanides and actinides) from aqueous solutions or waste waters. It is particularly preferred to extract iron ions, zinc ions, copper ions, lead ions, rhodium ions and mercury ions with fine-particle, water-insoluble polymers of aziridines and, in addition, chromium ions, manganese ions, nickel ions, silver ions and cadmium ions with carboxymethylated fine-particle, water-insoluble polymers of aziridines. Dithiocarbamates of fine-particle, water-insoluble polymers of aziridines may preferably be employed for extracting nickel ions from waste waters and as biocides.

Comparative Example 1

100 ml of methyl tert-butyl ether and 0.025 mol of ethylenediamine-1,4-bis(maleic acid semiamide) are initially introduced into an apparatus which is equipped for working under nitrogen and is provided with a stirrer and an inflow device, and the mixture is heated to 50° C. while being stirred. As soon as this temperature has been reached, one mole of ethylenimine is added over the course of 30 min and the reaction mixture is stirred at 50° C. for 48 h. A white, solid precipitate is formed which is filtered off with suction and dried. The fine-particle, crosslinked polyethylenimine which is thereby obtained is insoluble in water and customary organic solvents.

Comparative Example 2

100 ml of methyl tert-butyl ether and 0.025 mol (2.3 g) of epichlorohydrin are initially introduced into a polymerization apparatus which is equipped with a stirrer and a metering device, and the mixture is heated to 50° C. while being vigorously stirred. As soon as this temperature has been reached, 1 mol (43 g) of ethylenimine is added over the course of 30 min. The reaction mixture is stirred at 50° C. until ethylenimine can no longer be detected. The resulting white, solid precipitate is filtered off with suction and dried.

Comparative Example 3

100 ml of tetrahydrofuran and 0.025 mol (2.5 g) of 1,2-dichloroethane are initially introduced into the polymerization apparatus described in Example 1, and the mixture is heated to 50° C. while being stirred. As soon as this temperature has been reached, 1 mol (43 g) of ethylenimine is metered in over the course of 30 min. The reaction mixture is then stirred at 50° C. until ethylenimine can no longer be detected. A white, fine-particulate precipitate is obtained which is filtered off with suction and dried.

Comparative Example 4

100 ml of methyl tert-butyl ether and 0.025 mol (2.5 g) of 1,2-dichloroethane are initially introduced into the apparatus specified in Example 1, and the solution is heated to 50° C. As soon as this temperature has been reached, 1 mol (43 g) of ethylenimine are metered in over the course of 30 min. The reaction mixture is then stirred at 50° C. until ethylenimine can no longer be detected. The resulting white, fine-particule precipitate is filtered off with suction and then dried.

Comparative Example 5

In order to examine the formaldehyde absorption of fine-particle, crosslinked polyethylenimine, an aqueous solution having a formaldehyde content of 100 ppm was treated with 1 g/l of the fine-particle, crosslinked polyethylenimine which was prepared as described in Example 4, and then stirred for 24 h. The formaldehyde content of the solution was determined after the times given in the table.

TABLE 1

| Time [h] | 0 | 0.25 | 0.5 | 1 | 2 | 4 | 6 | 24 |
|---|---|---|---|---|---|---|---|---|
| Formaldehyde [ppm] | 100 | 70 | 30 | 15 | 7 | 6 | 5 | 5 |

Comparative Example 6

In order to demonstrate the extraction of acidic compounds from aqueous solutions, an aqueous solution having a content of 111 ppm of p-toluenesulfonic acid was treated with 1 g/l of the fine-particle, crosslinked polyethylenimine which was obtained as described in Example 4. The concentration of p-toluenesulfonic acid was measured after each of the times given in Table 2.

TABLE 2

| Time [h] | 0 | 0.25 | 0.5 | 1 | 2 |
|---|---|---|---|---|---|
| p-Toluenesulfonic acid [ppm] | 111 | 55 | 45 | 35 | 34 |

Comparative Example 7

150 g of fine-particle, crosslinked polyethylenimine (prepared as described in Example 4) are stirred, at room temperature for 4 h, in 1 l of a 1 molar aqueous solution of copper chloride. After that, the precipitate is filtered off with suction and washed with water until the concentration of $Cu^{2+}$ ions in the filtrate is less than 0.5 ppm. The blue, fine-particle residue is dried. Elemental analysis of the residue gives a copper:nitrogen ratio of 1:6.3.

Comparative Example 8

160 g of the fine-particle, crosslinked polyethylenimine, which was prepared as described in Example 4 and which has a content of basic nitrogen of 3.72 mol (determined by elemental analysis), are added to a solution of 0.62 mol of copper chloride in 1900 ml of water. The slurry is stirred at room temperature for 24 h. After that, the fine-particle solid is filtered off with suction and washed several times with water until copper ions can no longer be detected in the wash water. Elemental analysis of the residue gives a copper : nitrogen ratio of 1:10.5.

Comparative Example 9

80 g of bis(N-cyclohexyldiazeniumdioxy) copper complex are dissolved in 1500 ml of acetone. 123 g of fine-particle, crosslinked polyethylenimine, which contains 2.86 mol of basic nitrogen and was prepared as described in Example 4, and also 420 g of water, are then added to the solution. After the mixture has been stirred vigorously for 4 hours, the complex which has formed is filtered off with suction, washed with acetone and dried. The yield is 245 g. Elemental analysis of the complex gives a ratio of C:N:Cu of 52.6:18.6:1.

Comparative Example 10

200 g of the complex of crosslinked polyethylenimine and copper, which complex was obtained as described in Example 8, are suspended in 500 ml of water. After that, 123 g of N-cyclohexyldiazeniumdioxy potassium are introduced and the mixture is stirred at room temperature for 24 h. The precipitate is then filtered off with suction, washed with water and dried. Analysis of the filtrate indicated that 18.3 g of N-cyclohexyldiazeniumdioxy potassium were taken up by the complex of crosslinked polyethylenimine and copper which was used.

EXAMPLE 1

In a 2 l capacity boiler which is equipped for working under pressure and provided with a stirrer and metering devices, 4.9 g (0.1 mol) of sodium cyanide are added, with vigorous stirring, to a suspension, which has been heated to 80° C., of 76.5 g (1.78 mol of basic nitrogen) of the crosslinked, fine-particle, insoluble polyethylenimine, which was prepared as described in Comparative Example 4, in 730 ml of water. The pressure is decreased to values in the range from 200 to 300 mbar, and from 10 to 20 l of nitrogen/h are passed through the reaction mixture. 250 g (1.68 mol) of a 33% strength aqueous solution of sodium cyanide, and 178 g (1.78 mol) of a 30% strength aqueous solution of formaldehyde, are added continuously, separately from each other and at the same time, over a period of 2.5 h. After this metering has taken place, the suspension is stirred at 80° C. for a further 2.5 h and then treated with 1.8 g (18 mmol) of formaldehyde in order to destroy the excess alkali metal cyanide. 3 h after adding the formaldehyde, the stirrer is turned off and the aqueous solution is decanted from the precipitate. 300 ml of water are added and the decantation is repeated. After that, the residue is filtered off and washed repeatedly with water. A gel-like substance remains, which is dried. After the drying, 199 g of solid are obtained having a residual moisture content of 4.2%. The yield is 87% of theory. The degree of carboxymethylation is 80%.

EXAMPLE 2

43 g (1 mol of basic nitrogen groups) of the crosslinked, fine-particle polyethylenimine, which was prepared as described in Comparative Example 4, are dispersed in 650 ml of water. The suspension is heated to 80° C., and 94.5 g (1 mol) of chloroacetic acid, dissolved in 95 ml of water, are added dropwise over a period of 0.5 h. The reaction mixture is stirred at 80° C. for 8 h. After that, the precipitate is filtered off and dried in a stream of nitrogen. The filtrate still contains 28% of the added chloroacetic acid. The degree of substitution of the solid polyethylenimine is 72%.

EXAMPLE 3

The metal salt solutions listed in the following Table, each of which contains 100 ppm of metal ions, are prepared. The crosslinked, particulate polyethylenimine which was obtained as described in Comparative Example 4 is then added, in each case at a pH of 7, to these solutions while the carboxymethylated polyethylenimine which was prepared as described in Example 1 is added to another set of the metal salt solutions. The quantities of solid polyethylenimine were in each case 1 g/l. The suspensions were stirred vigorously. After various times, the metal ion concentration was analyzed quantitatively by means of atomic absorption spectroscopy. After having been treated for 6 hours, the solutions had the metal ion concentrations which are given in the following Table.

| Metal ion | Crosslinked polyethylenimine | Carboxymethylated, crosslinked polyethylenimine |
| --- | --- | --- |
| $Cr^{3+}$ | 27 ppm | 17 ppm |
| $Mn^{2+}$ | 82 ppm | 6 ppm |
| $Fe^{3+}$ | 9 ppm | 1 ppm |
| $Co^{2+}$ | 90 ppm | 4 ppm |
| $Rh^{3+}$ | 6 ppm | 2 ppm |
| $Ni^{2+}$ | 54 ppm | 3 ppm |
| $Cu^{2+}$ | 5 ppm | 2 ppm |
| $Ag^{+}$ | 55 ppm | 4 ppm |
| $Zn^{2+}$ | 8 ppm | 3 ppm |
| $Cd^{2+}$ | 64 ppm | 4 ppm |
| $Hg^{2+}$ | 8 ppm | 2 ppm |
| $Pb^{2+}$ | 12 ppm | 5 ppm |

EXAMPLE 4

In each case 2.5 g of the carboxymethylated polyethylenimine which was obtained as described in Comparative Example 5 were suspended in 50 ml of water and treated with in each case 10 mmol of calcium acetate, copper acetate or ferric chloride; the mixtures were then stirred at 50° C. for 2 h. The pH was adjusted to 3 by adding sulfuric acid. After 3 h, the solid was filtered off and then washed with 3×50 ml of water. The filtrate and the wash water were pooled and treated with 10 mmol of nitrilotriacetate. After that, the content of free nitrilotriacetate was determined by complexometric titration. This showed that the polymer had a loading capacity of 1.88 mmol/g for calcium, 2.93 mmol/g for copper and 3.075 mmol/g for iron. Consequently, the absorption of calcium ions, copper ions and iron ions from aqueous solutions is substantially greater than that of commercially available metal ion exchangers, which have a capacity of approximately 0.5 mmol/g of ion exchanger.

EXAMPLE 5

43 g (1 mol of basic nitrogen) of the crosslinked, fine-particle polyethylenimine which was prepared as described in Comparative Example 4 are suspended in 800 g of water. The suspension is cooled down to 0° C., and 0.33 mol of carbon disulfide is added in portions. During this time, the reaction temperature is maintained within the range of from 0 to 10° C. After the carbon disulfide has been added, the reaction mixture is stirred at room temperature until carbon disulfide can no longer be detected. The solid is filtered off with suction, washed with water and dried under reduced pressure. A pale yellow, fine powder is obtained.

We claim:

1. A modified, fine-particle, water-insoluble aziridine polymer obtained by reacting a fine-particle, water-insoluble, crosslinked aziridine polymer, in aqueous medium, with carbon disulfide or with formaldehyde and a nucleophilic agent from the group consisting of alkali metal cyanides, primary amines, secondary amines, alkali metal sulfites and alkali metal phosphites.

2. A modified, fine-particle, water-insoluble polymer as claimed in claim 1, obtained by carboxymethylating a fine-particle, water-insoluble, crosslinked polyethylenimine with formaldehyde and an alkali metal cyanide by means of a Strecker reaction.

3. A modified, fine-particle, water-insoluble, crosslinked polyethylenimine as claimed in claim 1, obtained by carboxymethylating under reduced pressure and at the same time passing an inert gas through the reaction mixture.

4. A modified, fine-particle, water-insoluble, crosslinked polyethylenimine as claimed in claim 1, obtained by carboxymethylating a fine-particle, water-insoluble, crosslinked polyethylenimine with formaldehyde and sodium cyanide at from 60 to 110° C. and under pressures of from $0.1 \cdot 10^5$ to $0.8 \cdot 10^5$ Pa (100 to 800 mbar).

5. A modified, fine-particle, water-insoluble, crosslinked polyethylenimine as claimed in claim 1, obtained by phosphonomethylating a fine-particle, water-insoluble, crosslinked polyethylenimine with formaldehyde and an alkali metal phosphite.

6. A modified, fine-particle, water-insoluble, crosslinked polyethylenimine as claimed in claim 1, obtained by a Mannich reaction of fine-particle, water-insoluble, crosslinked polyethylenimines with formaldehyde and a primary and/or secondary amine.

7. A modified, fine-particle, water-insoluble, crosslinked polyethylenimine as claimed in claim 1, obtained by reacting a fine-particle, water-insoluble, crosslinked polyethylenimine with formaldehyde and an alkali metal sulfite at from 60 to 110° C.

8. A modified, fine-particle, water-insoluble, crosslinked aziridine polymer as claimed in claim 1, obtained by reacting a fine-particle, water-insoluble, crosslinked polyethylenimine with carbon disulfide at from 0 to 30° C.

9. A method of removing heavy metals from aqueous solution, comprising contacting an aqueous solution with an amount of the polymer as claimed in claim 1 effective for removing heavy metals from the aqueous solution.

10. The method of claim 9, wherein the aqueous solution is a wastewater.

* * * * *

UNITED STATES PATENT AND TRADEMARK OFFICE
CERTIFICATE OF CORRECTION

PATENT NO. : 6,063,286

DATED : May 16, 2000

INVENTOR(S): Ulrich STEUERLE et al.

It is certified that an error appears in the above-identified patent and that said Letters Patent is hereby corrected as shown below:

On the title page, item [54], and at the top of Column 1, the title is incorrect. It should read as follows:

--[54] MODIFIED, FINE-PARTICLE, WATER-INSOLUBLE AZIRIDINE POLYMER AND USE THEREOF FOR REMOVING HEAVY METALS FROM AQUEOUS SOLUTION--

Signed and Sealed this

Twenty-second Day of May, 2001

*Attest:*

NICHOLAS P. GODICI

*Attesting Officer*     *Acting Director of the United States Patent and Trademark Office*